United States Patent [19]
Lamarre

[11] 3,875,699
[45] Apr. 8, 1975

[54] PLASTIC GRAPE STAKE

[76] Inventor: Arthur P. Lamarre, 1118 S. Legner Rd., Turlock, Calif. 95380

[22] Filed: Apr. 18, 1973

[21] Appl. No.: 352,234

[52] U.S. Cl. .................. 47/46; 138/115; 138/172; 256/19; 47/43; 239/276
[51] Int. Cl. .......................................... A01g 17/06
[58] Field of Search .......... 239/145, 273, 276, 208; 47/44–48.5; 256/1, 19; 248/516; 211/119.1, 119.15; 138/172, 177–178, 115

[56] References Cited
UNITED STATES PATENTS

| | | | |
|---|---|---|---|
| 2,734,640 | 2/1956 | Rosenberger | 211/119.15 X |
| 2,940,466 | 6/1960 | Speights | 239/273 X |
| 3,345,774 | 10/1967 | Delbuguet | 47/48.5 |
| 3,425,630 | 2/1969 | Fessler | 239/208 |
| 3,579,908 | 5/1971 | Morgan | 47/45 |
| 3,672,571 | 6/1972 | Goodricke | 239/145 |
| 3,776,522 | 12/1973 | Bartlett | 256/19 X |

*Primary Examiner*—Robert E. Bagwill
*Attorney, Agent, or Firm*—Gregg, Hendricson & Caplan

[57] ABSTRACT

A hollow plastic column or post having a particular cross sectional configuration to impart structural strength thereto for use as a grape stake, fence post or the like. A combination of the foregoing column with a like crosspiece and water connections for use as an overhead irrigation unit.

6 Claims, 8 Drawing Figures

PATENTED APR 8 1975 3,875,699

PLASTIC GRAPE STAKE

BACKGROUND OF INVENTION

Particularly in the field of agriculture, there have in the past been employed a wide variety of stakes, posts, poles and the like generally formed of wood for a number of different purposes, including the physical support of plants and the confinement of livestock and fowl. The use of wood for these general purposes was originally dictated by the availability of same; however, modern demands on the lumber industry have seriously reduced the availability of wooden stakes and posts, for example. In addition, it is realized that for many applications wooden stakes or poles are much less than ideal because of the limited lifetime thereof under exterior use conditions and the tendency of same to warp.

Because of the increasing difficulty in obtaining wooden members for use as grape stakes, tree poles and the like, there have been introduced on the market various substitutes including metal posts. While the availability of these substitute elements is not limited, there are numerous drawbacks to the widespread utilization of same, including problems of cost, weight and the tendency of same to rust in use.

A specific example of a widespread need in the field of agriculture is the replacement grape stake. Split redwood stakes were for years employed to support grape vines and to string wires between the stakes for support of grape vines. This source of stakes has almost disappeared and, in fact, hardwood stakes have been imported into this country for use as grape stakes. The present invention provides a replacement stake or pole that may be utilized, for example, as a grape stake, as a tree prop pole, as a fence post, and a wide variety of other applications. The present invention not only provides means for replacing wooden or metal units but, in addition, provides such replacement with a light unit of substantial indestructibility.

SUMMARY OF INVENTION

There is provided by the present invention a low cost, structurally strong column of lightweight and almost indestructible nature, particularly adapted for agricultural uses. The present invention is formed as a hollow column having a generally cylindrical cross section but including external corner portions or ribs. The cylindrical portion of the configuration is advantageous in providing resistance to radial forces and the corner portions strengthen the column against bending.

A grape stake formed in accordance with the present invention includes an upright, hollow column and a crosspiece of like configuration connected to the column by means of a pipe extending through both column and crosspiece and joined thereto. Upon both column and crosspiece there are provided indentations for attachment of wire or the like upon which grape vines may be supported.

The grape stake of the present invention is also particularly adapted for utilization in the overhead irrigation of vineyards, both for the general purpose of watering the vines and for preventing frosting of the vines. Irrigation stakes, as they are herein termed, may be provided at predetermined intervals along the row of grape stakes and are formed with a connecting pipe thereof extending upwardly from the crosspiece with means for attachment of an irrigation head or sprinkling head thereto. The irrigation stake also includes a water connection adjacent to the bottom of the column or upright for connection to piping whereby water flows through the irrigation stake and out the spray head atop same.

In its simplest form the present invention is provided only as a rigid, hollow column of the form generally indicated above for use as a support pole or the like for fruit tree limbs and may be pointed on the bottom so as to be readily driven into the ground for use as fence posts for wire fencing. The present invention is formed of a substantially impervious plastic material such as polyvinylchloride and is designed for extrusion so as to minimize the cost of stakes or the like produced in accordance with the present invention.

DESCRIPTION OF FIGURES

The present invention is illustrated as to particular preferred embodiments thereof in the accompanying drawings wherein.

DESCRIPTION OF PREFERRED EMBODIMENTS

Figure 1:
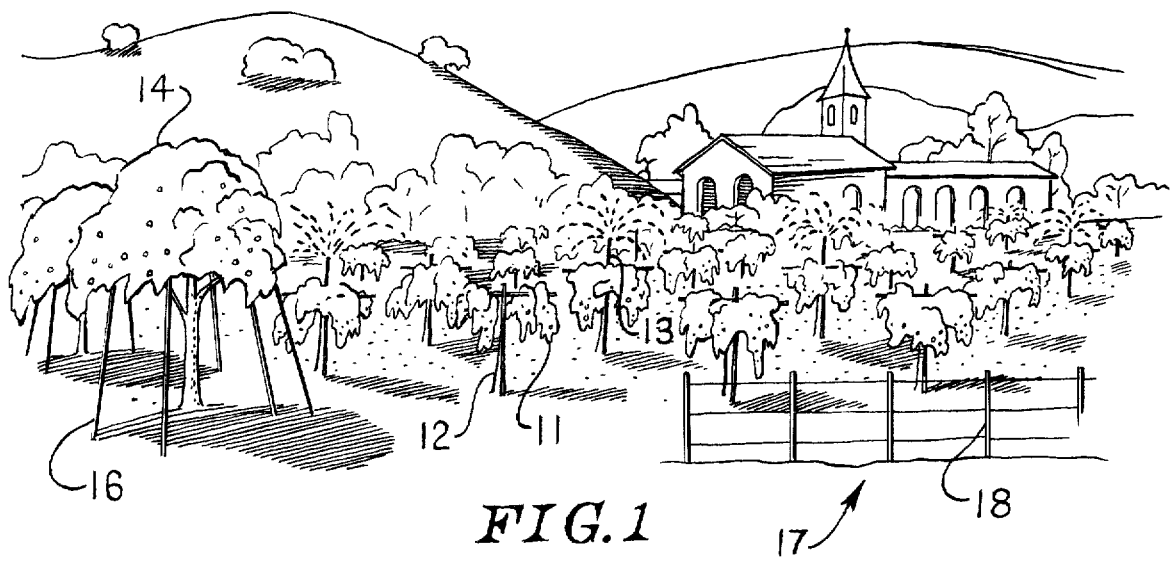
FIG. 1 is a pictorial illustration of a vineyard and orchard wherein the present invention is employed for a variety of different uses.

The present invention has a wide range of possible applications, particularly in the field of agriculture, and in FIG. 1 there is illustrated grape stakes 11 employed in a vineyard 12 and between which there are strung wires for supporting vines during the growing season thereof. These grape stakes 11 are formed in accordance with the present invention and may have interspersed along rows thereof irrigation stakes 13 also formed in accordance with the present invention and further described below. At the left of the vineyard 12 there is illustrated in FIG. 1 an orchard 14, wherein poles 16 are employed to support the limbs of fruit trees or the like. The poles must be relatively lightweight and yet quite strong for their intended purpose and may be advantageously formed in accordance with the present invention. There is furthermore illustrated in the lower right portion of FIG. 1 a fence 17 including fence post 18 formed in accordance with the present invention and having wire or the like strung between successive posts.

Considering now a grape stake or irrigation stake and referring to the remaining figures of the drawings, it will be seen that there is provided in the grape stake 11 an upright columnar portion 21 having a crosspiece 22 connected thereto and extending laterally thereof at a distance from a lower pointed end 23 of the columnar upright. The column 21 is formed with a generally hollow, cylindrical configuration that may be considered as including a relatively thin-walled tube 26 having corner portions or ribs 27 on the exterior thereof. The hollow central portion 28 of the column extends through the length thereof and the exterior configuration of the column is generally regular over the length thereof except as identified below so that the column may be readily extruded. This materially minimizes the cost of items formed in accordance with this invention. Further with regard to the cross sectional configuration of the column 21, it will be seen that the corner portions 27 provide a thickened or rib element, having somewhat of a triangular configuration along the exterior of the tube portion 26. These thickened corner or rib portions of the column will be seen to provide a structural rigidity to the column, particularly as against lateral forces that might otherwise tend to bend the column. Preferably each corner or rib portion tapers inwardly from the tubular portion 26 to form somewhat of a triangle in cross section having the outer portion thereof extending further outwardly as a longitudinal ridge along the length of the column. These corners, including the ridges thereon, extend outwardly from the tubular portion of the column substantially to the corners of a square having sides with a slightly greater dimension than the exterior diameter of the tubular portion. For many agricultural applications of the present invention such as, for example, grape stakes or the like, it is convenient to form the column of the present invention with an exterior dimension between edges of adjacent ribs of about 1⅜ inches with an interior cylindrical diameter of the order of 1 inch and exterior tubular diameter of the order of 1¼ inches. This then provides a wall thickness of the order of one-eighth inch or slightly less and a radial rib depth of the order of three-eighths inch. It will, of course, be apparent that other dimensions and relative dimensions of the column may be employed.

Figure 5A:
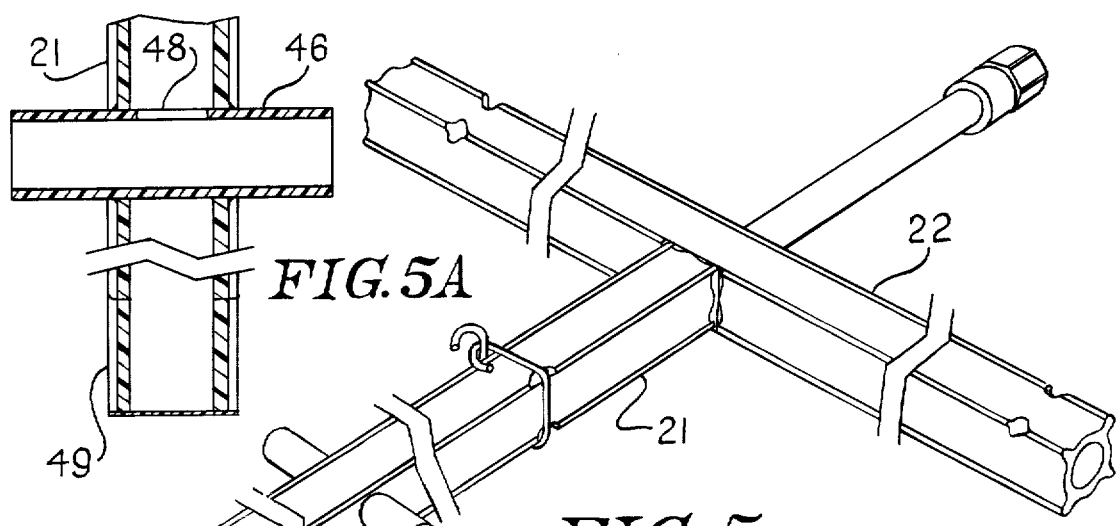
FIG. 5A is a partial sectional view of the lower portion of an irrigation stake taken in the plane 5A—5A of FIG. 2.
Figure 5:
FIG. 5 is a perspective view of an irrigation stake for vineyards formed in accordance with the present invention.

The column briefly described above may, for example, be employed as a fence post or a pole for propping up the limbs of fruit trees or the like, and commonly for this application, as well as many others, the lower end of the column is pointed as by cutting two of the opposite sides at an angle to each other to form a point. This then facilitates driving the column into the ground. Particularly when the present invention is utilized as a grape stake or the like, there are provided small cutouts or indentations 31 in the ribs or corners 27 for the purpose of attaching wire to the columns. These indentations 31 extend laterally across a rib and may, for example, be provided in two of the four ribs of the column in pairs along the length of the column, as generally indicated in FIGS. 3 and 5.

Figure 4:
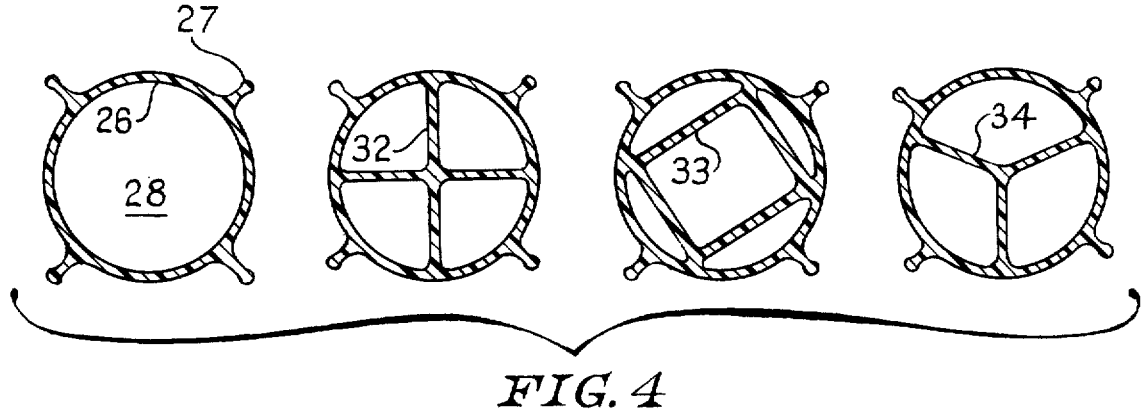
FIG. 4 illustrates at A, B, C and D, alternative interior structures of the stake or column of the present invention.

The interior structure of the column 21 hereof is subject to variation, as indicated in FIG. 4. The column may include internal ribs 32 disposed in orthogonal configuration, walls 33 forming an internal box-like shape, or ribs 34 extending from the walls inwardly to the center in other spaced relationships. These internal walls or ribs may be included for added strength of the column but are to be in such a form and location as to facilitate extrusion of the column configuration. With any of these internal column configurations, the crosspiece connection is varied inasmuch as the pipe 41 is either slotted to fit over the ribs or walls upon insertion in the column or does not extend into the column.

Figure 6:
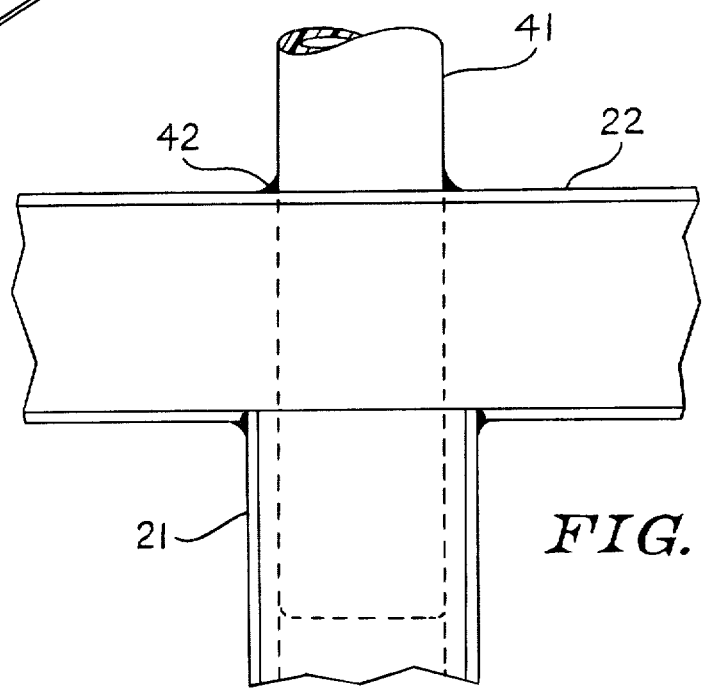
FIG. 6 is a partial side elevational view of the joinder of upright and crosspiece of the irrigation stake of FIG. 5.

The grape stake 11 of the present invention includes the above-noted crosspiece 22 which is rigidly attached to the upright column 21. This attachment is preferably accomplished, as generally illustrated in FIG. 6, by means of a pipe 41. This pipe 41 has an external diameter substantially equal to the internal diameter of the column 21 and the lower end of the pipe is fitted into the upper open end of this column. A hole is drilled transversely through the center of the crosspiece 22 with the hole diameter being equal to the external diameter of the pipe 41 so that the pipe is fitted transversely through the crosspiece 22. An adhesive 42 is applied to the contacting surfaces of the pipe 41, column upright 21, and crosspiece 22. The column and crosspiece of the present invention may be advantageously formed of extruded polyvinylchloride material. Similarly the pipe 41 might be formed of this same material and conventional polyvinylchloride adhesive may be utilized to join together the pipe, crosspiece and upright.

Figures 2, 3:
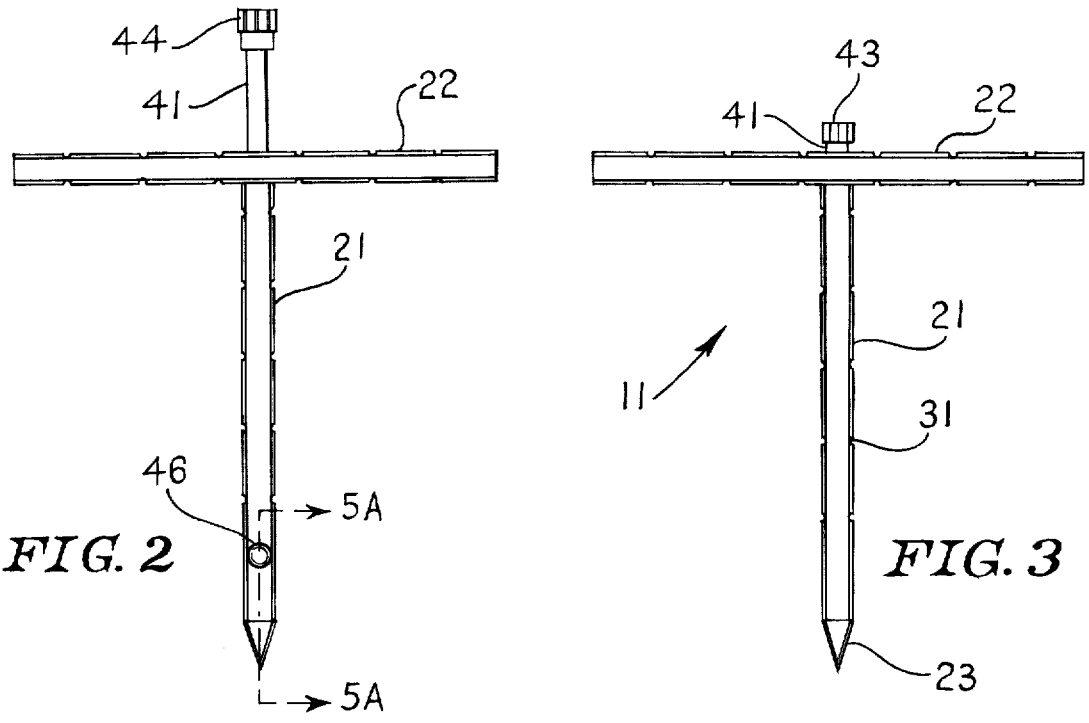
FIG. 2 is a side elevational view of an irrigation stake in accordance with the present invention.
FIG. 3 is a side elevational view of a grape stake in accordance with the present invention.

A grape stake 11, such as illustrated in FIG. 3, may have only a stub pipe employed for the connection of crosspiece and upright with a cap 43 secured to the top of the pipe above the crosspiece. For an irrigation pipe, such as illustrated in FIG. 2, the pipe 41 extends some distance upwardly from the crosspiece and is provided with a fitting 44 at the top of the pipe for connection of a sprinkling head or the like. The irrigation pipe, as it is herein termed, is basically formed in the same manner as the grape stake but includes means for connecting a water supply to the upright. This connection may be provided in the form of a short crosspipe 46 which extends laterally through the upright in the lower portion thereof and is attached thereto as by adhesive. The external diameter of this crosspipe 46 is substantially the same size or slightly larger than the internal diameter of the upright so that the pipe seals the upright where it passes through same. A hole 48 is formed in the upper side of the crosspipe interiorly of the upright column 21 to provide communication between the interior of the crosspipe and the interior of the upright above the pipe. Thus, by attachment of a line to the crosspipe and extending same to a water pipe, water will be forced into the upright and thence upwardly through the upper pipe 41 and out of the sprinkling head that is attached to the top of same.

In FIG. 5 the irrigation pipe is illustrated to have an open lower pointed end; however, it is desirable under some circumstances to close this end as by the application of thin plastic plates 49 onto the cut sides of the end of the upright. This attachment may be readily made by the same type of adhesive as is employed in other parts of the structure and the closure serves to prevent entry of dirt into the upright when it is placed in the ground.

Figure 7:
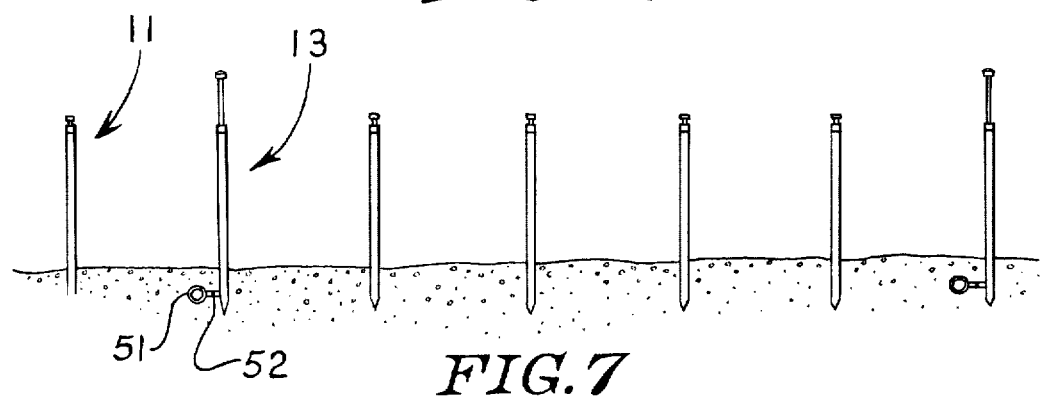
FIG. 7 is a schematic elevational view of grape stakes and irrigation stakes implanted in a vineyard.

Grape stakes formed in accordance with the present invention may be driven into the ground, as indicated in FIG. 7. Irrigation stakes may be placed in spaced relation in a row of grape stakes and connected to water pipes 51 as by piping or tubing 52, also as shown in FIG. 7. Wires are then strung between the stakes to support vines or the like and conventional wire attachment means 54, as shown in FIG. 5, may be employed for connecting wires to the stakes. The stakes or poles of the present invention are formed of a lightweight plastic material of high strength, preferably polyvinylchloride, by extrusion processing. The product is inexpensive and substantially impervious to sprays, fertilizers and atmospheric conditions.

The present invention has been described with respect to particular preferred embodiments thereof; however, variations and modifications are possible and thus it is not intended to limit the present invention to the precise details of description or illustration.

What is claimed is:

1. A plastic stake comprising a pair of like hollow columns having longitudinally extending integral external ribs with the interior portions of said ribs having a generally triangular cross section and formed by the extrusion of a high strength plastic material, a first column being disposed transversely across the top of a second column as a crosspiece with the ribs on the underside of the first column resting upon the ends of the ribs of the second column and a pipe extending into the open top of the second column transversely through the first column with adhesive joining the columns and pipe in a rigid unit.

2. The stake of claim 1 further defined by said pipe extending upwardly from said crosspiece for engagement with a sprinkler, and a crosspipe extending laterally through said second column near the bottom thereof in sealing relation thereto and having an opening in the top of the pipe communicating with the interior of said second column for supplying water to the column to flow upwardly therethrough to said sprinkler.

3. The stake of claim 1 further defined by spaced lateral indentations in said external ribs for attachment of wires thereto for the support of vines or the like.

4. A grape stake comprising a pair of like columns having a hollow interior and spaced apart longitudinal exterior ribs with spaced lateral indentations therein, the interior portions of said ribs having a generally triangular cross section, one of the columns comprising an upright and the other column comprising a crosspiece extending transversely of the upright across the top thereof with ribs on the crosspiece resting on the upper ends of ribs of the upright, a connecting pipe having an external diameter substantially equal to the internal diameter of said columns extending into the upper end of said upright and through a mating opening transversely through the crosspiece and rigidly secured to both upright and crosspiece to join them all together as a single unit for insertion of the upright in the ground and attachment of wire to upright and crosspiece at rib indentations for supporting vines.

5. The grape stake of claim 4 further defined by a crosspipe extending laterally into said upright substantially below said crosspiece and communicating with the interior of said upright at the top of the crosspipe for supplying water to the interior of the upright, and said connecting pipe extending substantially upward from said crosspiece and adapted for connection to a sprinkler head whereby the stake comprises an irrigation unit.

6. A plastic irrigation stake comprising a hollow cylindrical column having four external ribs extending longitudinally thereof and equally spaced apart about the column, said ribs having a dimension radially of said column substantially equal to twice the wall thickness of said column and the interior portion of said ribs having a generally triangular cross section.

* * * * *